United States Patent [19]

Wagner

[11] Patent Number: 4,975,008

[45] Date of Patent: Dec. 4, 1990

[54] FASTENER ASSEMBLY WITH SEALING GROMMET

[75] Inventor: David P. Wagner, Geneva, Ill.

[73] Assignee: Illinois Tool Works, Inc., Glenview, Ill.

[21] Appl. No.: 331,150

[22] Filed: Mar. 31, 1989

[51] Int. Cl.$^5$ .............................................. F16B 21/00
[52] U.S. Cl. .................................. 411/337; 411/369; 411/533; 411/542
[58] Field of Search ............... 411/542, 368, 367, 371, 411/546, 544, 531, 370, 533, 337, 353, 999, 112, 113, 915

[56] References Cited

U.S. PATENT DOCUMENTS

| | | | |
|---|---|---|---|
| 2,915,152 | 12/1959 | Graham | 411/369 X |
| 3,301,121 | 1/1967 | Newcomer | 411/368 |
| 3,500,712 | 3/1970 | Wagner | 411/371 |
| 3,519,279 | 7/1970 | Wagner | 411/542 X |
| 4,732,519 | 3/1988 | Wagner | 411/107 X |

FOREIGN PATENT DOCUMENTS 1562269  2/1969  France ................. 411/369

Primary Examiner—Rodney M. Lindsey
Attorney, Agent, or Firm—Schwartz & Weinrieb

[57] ABSTRACT

A threaded fastener assembly which includes a threaded fastener about which is securely disposed an axially movable washer with a resilient grommet fitted thereover. The threaded fastener assembly is adapted to be preassembled within a first apertured work piece such as, for example, a rocker arm cover which is to be mounted upon a second apertured work piece such as, for example, an engine block. The threaded fastener assembly is retainable within the first apertured work piece while holding the fastener in a freely axially movable configuration which permits the fastener to be moved into an elevated position relative to the washer and grommet so as to prevent the fastener from projecting through the bottom surface of the first work piece, thus preventing interference with other surfaces or the second workpieces, and the structure provides seals for preventing fluid from leaking through the apertures of the workpieces.

15 Claims, 1 Drawing Sheet

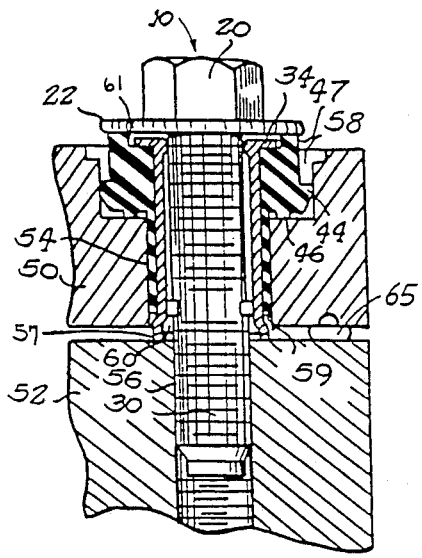

FASTENER ASSEMBLY WITH SEALING GROMMET

FIELD OF THE INVENTION

This invention relates generally to a threaded fastener assembly and more particularly to a threaded fastener, washer, and resilient grommet assembly which is adapted to be preassembled within a first apertured work piece for subsequent assembly with a second work piece.

BACKGROUND OF THE INVENTION

In prior art fastener assemblies such as, for example, those shown in U.S. Pat. Nos. 3,500,712 and 4,732,519 (the '712 and '519 patents respectively), solutions to various fastener assembly problems have been developed or derived. In the '712 patent, a resilient sealing washer interengaged with a rigid washer is used to seal a first aperture against fluid flow. The object of the '712 patent is to provide a preassembled washer unit comprised of a rigid washer and a sealing washer which are assembled in such a way as to prevent the sealing washer from shifting radially outward when a clamping force is applied thereto. In the '519 patent, a fastener is disposed in axially movable engagement within a washer and a rubber grommet is stretched over the outside thereof so as to seal the aperture through which the assembly is inserted.

While both the '712 and '519 patents provide solutions to their respective problems, neither patent provides solutions to both the problems of completely sealing an aperture against fluid flow from the inside of the assembled work pieces and securely preassembling an axially movable fastener within a workpiece in an elevated position.

In many instances, such as in the assembly of a rocker arm cover onto an engine block, fastener assemblies are required to seal the apertures within which they are inserted against fluid flow and to securely retain the assembly in an elevated position so as to avoid interference with surfaces upon which the preassembled work piece may be placed during assembly or while disposed in storage.

OBJECTS OF THE INVENTION

A general object of the invention is to provide an axially movable threaded fastener assembly which completely seals the aperture through which it is installed against fluid flow from the inside of the work pieces which it fastens together.

Another object of this invention is to provide a threaded fastener assembly which retains a fastener in a freely axially movable configuration so as to permit the fastener to be moved into an elevated position with respect to a work piece with which it is preassembled so as to, in turn, prevent the fastener from projecting through the bottom surface of the work piece, thus preventing interference with other surfaces.

Yet another object of the present invention is to limit the amount of compression created by means of the fastener upon the resilient grommet and the resilient gasket. In accordance with the foregoing, the present invention comprises an axially movable threaded fastener assembly with a fastener, washer, and a grommet of rubber or other resilient sealing material which completely seals the apertures through which it is inserted, and prior to final installation, the assembly retains the fastener at an elevated position so as to prevent the fastener from projecting through the bottom surface of a work piece whereby interference with other surfaces is effectively prevented.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements throughout the several views, and in which:

FIG. 1 is an exploded perspective view of the fastener assembly of the present invention showing the telescopic relationship between the fastener, washer means, and grommet;

FIG. 2 is a partial sectional view of the preassembled fastener assembly in a partially assembled condition;

FIG. 3 is a fragmentary partial sectional view of the fastener assembly as installed so as to fasten a first apertured work piece to a second apertured work piece;

FIG. 4 is a fragmentary partial sectional view of the fastener assembly incorporating a modified form of the present invention partially assembled within a first work piece;

FIG. 5 is a fragmentary partial sectional view of the fastener assembly of FIG. 4 fully assembled within first and second work pieces; and FIG. 6 is a fragmentary partial sectional view of the fastener assembly incorporating another modified form of the present invention fully assembled within first and second work pieces.

DETAILED DESCRIPTION OF THE ILLUSTRATED EMBODIMENTS

FIG. 1 shows an exploded view of a fastener assembly 10 illustrating the relationship between a fastener 12, a washer 14 and a resilient grommet 16. The fastener 12, which is formed of steel or other suitable rigid material, is comprised of a head portion 18, including a tool engaging section 20 and a clamping surface 22, attached to an axially extending shank portion 24. The shank portion 24 is formed with an upper shank section 26, two protuberant wings 28, a lower threaded shank section 30, and a reduced diameter insertion end 32. Preferably the wings or protuberances 28 are integrally formed upon the shank 24 between the upper shank portion 26 and the threaded lower shank portion 30 at approximately 180° with respect to each other.

The washer 14 is comprised of a flange portion 34 and a sleeve portion 36 extending axially therefrom and having an annular crimp or internal bead 38 formed therebetween. The washer 14 includes a central bore 25 which slidably receives the shank portion 24 of the fastener 12 which projects through the washer bore 25 and is held in place by means of the crimp or bead portion 38 which provides inwardly projecting abutment means of reduced internal diameter which is smaller than the diametrical dimension from wing tip 28 to wing tip 28. Thus the fastener is retained within the washer while permitting axial movement between the pieces by engagement of the bead or abutment means 38 with the protuberances 28. A flare 40 is formed at the distal end of the washer sleeve 36 for the purpose described below.

The washer 14 telescopically extends through a central bore 41 within the grommet 16. The grommet 16 has a body portion 42 around which is formed an annular radially projecting gripping and sealing flange or bead 44. An annular sealing ring 46 projects axially from an end face of the body 42 and a sleeve 48 of substantial length also extends axially from an inner annular margin of the body 42.

The fastener assembly 10 is adapted to be preassembled with a first work piece 50 for subsequently securing the first work piece 50 to a second work piece 52. The work piece 50 is formed with a bore or aperture 54 having an enlarged outer end or counterbore 58 for receiving the body portion 42 and the sealing flange 44 of the grommet member 16 of the fastener assembly. The second work piece 52 is formed with an internally threaded aperture 56 positioned for alignment with the aperture 54 of the first workpiece 50. The annular bore gripping flange 44 helps to compressibly hold the grommet 16 and fastener 12 retained therein when the fastener assembly is inserted into the first work piece 50. Preferably the grommet 16 is integrally formed of a resilient rubber or other suitable synthetic material which is resistant to the fluids which may be encountered during the sealing of the aperture, such as, for example, oils and other petroleum products within an automotive application or environment.

Axial movement between the fastener 12 and the washer 14 is possible since the diameter of the washer bore 25 is greater than the diameter of the shank portion 24 of the fastener 12. On the other hand, freedom of movement is not desirable between the washer 14 and the resilient grommet 16 since it is the grommet 16 that holds the fastener assembly 10 in its preassembled state within the aperture of the first workpiece 50. Therefore, the grommet 16 and washer 14 are dimensioned and formed so as to provide a snug fit which resists minor forces which might otherwise free the washer 14 from the grommet 16.

FIG. 2 shows the components of the preassembled fastener assembly 10 in a partially assembled condition. As shown, the crimp or bead 38 has a smaller diameter than the wings 28 disposed upon the shank 24, thereby allowing limited relative axial movement between the fastener 12 and washer 14, which movement is limited by means of the distance of the wings 28 from the clamping surface 22. Also shown is the manner in which the flare 40 distorts the sleeve 48 of the rubber grommet 16. Since the outside diameter of the flare 40 is greater than the inside diameter of the rubber grommet sleeve 48, the sleeve 48 must be stretched over the flare portion 40 which aids in retaining the grommet 16 upon the washer 14. As shown in FIG. 2, when the fastener assembly 10 is preassembled within the work piece 50, the fastener 12 can be displaced upwardly so that its lower end does not project below the bottom surface of the work piece. This facilitates subsequent positioning and alignment of the work piece 50 with respect to the second work piece 52.

FIG. 3 provides the best illustration of the use of the preferred embodiment of the fastener assembly 10. In FIG. 3, the first work piece 50 is positioned over the second work piece 52 such that the apertures 54, 56 of the two work pieces are substantially aligned. Once in such a position, the fastener 12 of the assembly 10 which has been preassembled within the work piece 50 is pushed through the aperture 54 of the first work piece 50 so as to bring the threaded portion 30 of the shank 24 in aligned interengagement with the complementarily threaded aperture 56 of the second work piece 52. As shown, when the fastener 12 is driven into the second work piece aperture 56, the rubber grommet 16 becomes seated within the counterbore 58.

Since the washer 14 is dimensioned and formed so as to provide a space between the washer bore 25 and shank 24 of fastener 12 thus allowing free telescoping movement between the pieces, two potential fluid flow paths are formed through the aperture 54 of the first work piece 50. The first path is formed by means of the gap 59 defined between the inside surface of the aperture 54 and the outside surface of the washer sleeve 36. This path is at least partially sealed by means of the rubber grommet sleeve 48 which compressibly fills the gap between the two surfaces of workpiece 50 and washer 14. The rubber grommet 16 also seals this gap against fluid flow from the inside of the assembled work pieces 50, 52, by means of the sealing engagement of the annular sealing ring 46 with the bottom of the counterbore 58 and the sealing engagement of the flange 44 with the sidewall of the counterbore 58.

The second fluid flow path is formed by means of a gap 60 defined between the outside surface of the fastener shank 24 and the inside surface of the washer sleeve 36. This gap 60 is sealed by means of sealingly compressing the underside of the clamping surface 22 of fastener 12 against an axially extending annular rim 47 of the grommet body 42 which projects upwardly around the flange 34 of the washer. In this compressed state, the washer flange 34 seats within a rim counterbore 61 of grommet body portion 42, thereby sealing the washer flange 34 against the base of the rim counterbore 61 and countersinking the flange 34 within counterbore 61 so as to prevent interference with the seal defined between the clamping surface 22 and the annular sealing rim 47.

The above described sealing structure has the advantage of effectively sealing the aperture 54 while retaining the telescopically movable characteristics of the fastener 12 by positioning the sealing material upon the outside of the washer 14. Additionally, the grommet 16 configuration of the present invention and the annular bore gripping flange 44 help to center the fastener assembly 10 when inserted within the aperture 54 of the workpiece 50. The annular bore gripping flange 44 also assists in retaining the fastener assembly 10 within the aperture of the first work piece 50 prior to final assembly with the second work piece 52 by compressibly gripping the inside wall of the counterbore 58. Furthermore, when the clamping surface 22 of fastener 12 is tightened against the sealing rim 47, of grommet 16, the compressive forces tend to compressibly deform the body portion 42 of the grommet 16 in the axial direction and thereby radially expand the annular gripping flange 44 against the inside surface of the counterbore 58, thus providing additional sealing against fluid flow as mentioned above. Yet another advantage of the sealing structure shown in FIG. 3 is that when properly tightened a bottom rim portion 57 of the washer 14 contacts the top surface 63 of the second workpiece 52. The contact of the rim 57 against the surface 63 prevents excessive compression of the grommet 16 or an additional sealing gasket 65 interposed between the first and second workpieces 50 and 52.

Turning now to an alternative embodiment, shown in FIGS. 4 and 5 wherein elements corresponding to those described above are designated by the same reference numerals with the suffix a added, a simplified version of rubber grommet 16a is illustrated which has a fastener elevating annular ring 62 formed around the inside wall of the rubber grommet sleeve 48a within the vicinity of the lower end thereof. The annular ring 62 is dimensioned so as to provide a minor obstruction to the passage of the assembled washer 14a and fastener 12a through the grommet sleeve 48a. The obstruction created by means of the ring 62 elevates the fastener 12a and suspends the washer 14a within the aperture 54a of the workpiece 50a. The washer flange 34a engages the clamping surface 22a of the fastener 12a, thus limiting the axial travel of the fastener 12a within the washer 14a and grommet 16a. The obstruction is easily overcome by means of the pressure and/or the weight of a tool applied to the tool engaging member 20a of fastener 12a so as to drive the threaded portion of the shank 30a into the complementary threaded aperture 56a of the second work piece 52a.

Retention of the washer 14a and the fastener 12a in this elevated state allows the fastener assembly 10a to be preassembled within the first work piece 50a so that when the work piece 50a is placed upon another surface or upon top of the second work piece 52a, prior to aligning the aperture 54a defined within the first work piece 50a with the aperture 56a defined within the second work piece 52a, the fastener 12a does not project through the bottom of the first workpiece 50a and therefore does not interfere with the other surface. Furthermore, the retaining characteristics of the fastener assembly 10a tolerate a degree of tipping or inclination without unseating the fastener assembly 10a from the aperture 54a defined within the first work piece 50a.

FIG. 5 illustrates the fastener assembly 10a as shown in FIG. 4 when the same is within the first and second work pieces 50a, 52a. When the fastener 12a is driven into the threaded aperture 56a of the second workpiece 52a, the fastener elevating annular ring 62 of grommet 16a is compressed between the inside surface of the aperture of workpiece 50a 54a and the outside surface of the washer sleeve 36a so as to form a sealing couple with the flare 40a of the washer sleeve 36a.

Another alternative embodiment of the present invention is illustrated in FIG. 6 wherein elements corresponding to those described above are designated by the same reference numerals with the suffix b added. The embodiment shown in FIG. 6 provides a simplified grommet 16b which is formed without the above-mentioned counterbore 61. As noted above, the exposed rim 47 seals the path between the inside surface of the washer 14 and the outside surface of the fastener 12 (see FIGS. 2–5). In the absence of the sealing engagement between the rim 47 and clamping face of the screw, a resilient coating material 68 is applied to the threaded portion 30b of the shank 24b. This coating material seals both the inside surface of the washer and the threads within the second work piece aperture 56b.

In use, the fastener assembly 10 is inserted into an aperture 54 of the first work piece 50. Once inserted, the fastener assembly 10 is retained within the aperture 54 by means of the frictional interaction defined between the outside surface of the grommet 16 and the inside surface of the aperture 54. The fastener 12 may be held and retained at an elevated position within the grommet 16 while positioning the work piece 50 over the work piece 52. The fastener 12 is then extended so as to interengage the threaded aperture 56 of the second work piece 52.

Once the first and second work pieces 50, 52 are fastened together, the fastener assembly 10 prevents fluid flow from the inside of the assembled work pieces. The fluid flow path formed by means of the gap 59 defined between the inside surface of the aperture 54 and the outside surface of the washer 14 is sealed by means of the sleeve 48 of the grommet 16 lining the aperture 54 within the first work piece 50 and the body portion 42 being axially compressed and radially expanded the counterbore 58 of the first work piece 50. In the embodiment of FIGS. 4 and 5 employing the ring 62 upon the inside of the grommet sleeve 36a, compression of the ring 62 further enhances this sealing action.

The fluid flow path formed by means of the gap defined between the outside surface of the fastener shank 24 and the inside surface of the washer 14 is sealed by means of the underside of the clamping surface 22 vertically compressing directly against the rim 47 at the top side of the body portion 42 of grommet 16. In this configuration the counterbore 61 is provided as an inset for the washer flange 34 such that when the washer flange 34 is compressed into the counterbore 61, the washer flange 34 does not interfere with the seal formed between the clamping surface 22 and the rim 47.

In the alternative embodiment of FIG. 6, the clamping surface 22b contacts the top side of the washer flange 34b and not the body portion 42b. The second path is sealed by means of the resilient coating material 68 on the threaded lower shank portion 30b. When the fastener 12b is driven into the second work piece aperture 56b the resilient coating material 68 seals both the threads of the aperture 56b and the area defined between the shank 24b of fastener 12b and the lower portion of the washer sleeve 36b and the flare 40b.

While preferred embodiments of the present invention have been shown and described, it is envisioned that those skilled in the art may devise various modifications without departing from the spirit and scope of the claims appended hereto. It is therefore understood that within the scope of the appended claims, the present invention may be practiced otherwise than as specifically described herein.

The invention is claimed as follows:

1. A fastener assembly adapted for use in connection with at least one apertured work piece for sealing said aperture against fluid flow, said fastener assembly comprising:

a fastener;
   a washer;
   a resilient grommet;
   said fastener having a head with a clamping surface thereunder and a shank;
   said shank having an upper shank portion, a threaded lower shank portion, and protuberance means spaced a predetermined axial distance from said head between said upper shank portion and said threaded lower shank portion;
   said washer including a flange, an axially extending sleeve, and abutment means projecting inwardly of said sleeve; said washer being slidably telescopically associated with said fastener, with an inner dimension of said abutment means being less than an outer dimension of said protuberance means for thereby securing said fastener within said washer;

said at least one workpiece having counterbored recess means defined therein so as to define at least one substantially horizontal sealing surface and at least one substantially vertical sealing surface;

said resilient grommet surrounding and sealingly engaging said washer and including means disposed within and sealingly engageable with said at least one substantially horizontal sealing surface and said at least one substantially vertical sealing surface of said counterbored recess means defined within said at least one work piece so as to seal a first fluid flow path defined between said washer and said aperture of said at least one work piece as a result of axial compression and radial expansion of said grommet means with respect to said at least one substantially horizontal sealing surface and said at least one substantially vertical sealing surface, respectively, of said counterbored recess means defined within said at least one workpiece when said fastener assembly is fully assembled with said at least one workpiece;

said shank and said washer defining a second fluid flow path therebetween; and means for sealing said second fluid flow path when said fastener assembly is fully assembled with said at least one work piece.

2. A fastener assembly according to claim 1, wherein said grommet includes a sleeve surrounding said washer sleeve, said grommet sleeve including an annular ring integral with an inside surface thereof for retaining said washer in said resilient grommet.

3. A fastener assembly according to claim 1, wherein a body portion of said resilient grommet comprises an outer surface engageable with a surface of said aperture into which said fastener assembly and said body portion are assembled for providing a seal between said surfaces, said body portion further including an annular bore gripping element integrally formed on the outside thereof having an outside dimension slightly larger than or equal to said counterbored recess means for securing and centering said fastener assembly in said aperture of said at least one apertured work piece.

4. A fastener assembly according to claim 1, which includes a band of resilient sealing material around said lower threaded shank portion of said fastener shank for sealing said second fluid flow path.

5. A fastener assembly according to claim 1, wherein said grommet includes a sleeve and said sleeve of said resilient grommet has an annular ring integrally formed about the inside surface of said sleeve for maintaining said fastener in an elevated position in relation to said at least one work piece when said fastener assembly is preassembled in said at least one apertured work piece.

6. A fastener assembly as set forth in claim 1, wherein:
said at least one apertured workpiece comprises two workpieces respectively provided with co-axially aligned aperture means.

7. A fastener assembly as set forth in claim 6, further comprising:
a band of resilient sealing material disposed around said lower threaded shank portion of said fastener shank for providing a fluid seal for the threaded engagement defined between said lower threaded shank portion of said fastener shank and a threaded portion of said aperture defined within said second workpiece.

8. A fastener assembly as set forth in claim 1, wherein:
said grommet comprises a first annular ring portion for engaging said substantially vertical sealing surface of said counterbored recess means, and a second annular ring portion for engaging said substantially horizontal sealing surface of said counterbored recess means of said at least one workpiece, whereby said first and second annular ring portions of said grommet seal said first fluid flow path.

9. A fastener assembly as set forth in claim 1, wherein said grommet further comprises:
a second counterbored recess means for receptively housing said flange of said washer; and
an upstanding annular sealing ring engageable with said clamping surface of said fastener head and annularly surrounding said second counterbored recess means and said flange of said washer whereby said engagement of said upstanding annular sealing ring with said clamping surface of said fastener head seals said second fluid flow path.

10. A fastener assembly for connecting a first apertured work piece to a second apertured work piece and for sealing the aperture defined within said first apertured work piece against fluid flow therethrough, comprising:
a fastener;
a washer;
a resilient grommet;
said fastener comprising a head, a threaded shank having a threaded portion remote from said fastener head for threadedly engaging a threaded portion of said second apertured work piece, and protuberance means upon said shank and axially spaced from said head;
said washer being axially slidable upon said shank between said head and said protuberance means and being retained upon said shank by said protuberance means;
said first workpiece having counterbored recess means defined therein so as to define at least one substantially horizontal sealing surface and at least one substantially vertical sealing surface;
said resilient grommet including a body portion encircling and mounted upon said washer, said body portion including means for sealingly engaging a surface of said first apertured work piece, and said grommet further including means disposed within and sealingly engaging said at least one substantially horizontal sealing surface and said at least one substantially vertical sealing surface of said counterbored recess means defined within said first apertured workpiece so as to seal a first fluid flow path defined between said washer and said aperture of said first apertured workpiece as a result of axial compression and radial expansion of said resilient grommet means with respect to said at least one substantially horizontal sealing surface and said at least one substantially vertical sealing surface, respectively, of said counterbored recess means defined within said first apertured workpiece when said fastener assembly is fully assembled as a result of said threaded engagement of said threaded portion of said fastener and said threaded portion of said second apertured workpiece;
said shank and said washer defining a second fluid flow path therebetween; and
means for sealing said second fluid flow path defined between said washer and said shank.

11. A fastener assembly as defined in claim 10, wherein said seal means of said grommet body portion comprises an annular rim of said grommet body grommet portion sealingly engageable with said head of said fastener.

12. A fastener assembly as defined in claim 10, wherein said seal means for sealing said second fluid flow path comprises a band of resilient sealing material disposed around said threaded shank of said fastener.

13. A fastener assembly as defined in claim 10, wherein said grommet means disposed within said counterbored recess means comprises an annular flange engageable with a vertical side wall of said counterbore in said first apertured work piece and an annular sealing ring engageable with a bottom horizontal surface of said counterbore.

14. A fastener assembly as defined in claim 10, wherein:

said washer comprises an annular flange and a tubular sleeve extending axially from said flange a distance substantially more than a distance defined between said protuberance means and said head of said fastener; and means projecting radially inwardly from said sleeve of said washer for engagement with said protuberance means of said fastener for retaining said washer and said fastener in assembled relationship.

15. A fastener assembly as defined in claim 14, wherein said grommet includes a tubular sleeve portion extending axially beyond a free end of said washer sleeve portion, said grommet sleeve being engageable with said washer sleeve for initially retaining the grommet and the washer in partially assembled relationship, said washer, when in said partially assembled relationship; supporting said fastener for preventing an entering end of the fastener from projecting beyond said first work piece.

* * * * *